United States Patent
D'Souza et al.

(10) Patent No.: US 9,967,332 B1
(45) Date of Patent: May 8, 2018

(54) PEER-TO-PEER FILE SHARING AND COLLABORATION

(71) Applicant: Amazon Technologies, Inc., Seattle, WA (US)

(72) Inventors: Preetam J. D'Souza, Mountain View, CA (US); Brendan Donald Lee, San Jose, CA (US); Kyu Simm, Foster City, CA (US); Kevin George Gillett, Palo Alto, CA (US); Olivier Suritz, Sunnyvale, CA (US); Subha Narayanamurthi, Sunnyvale, CA (US); Robert Norris Lance Krentler, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 14/630,526

(22) Filed: Feb. 24, 2015

(51) Int. Cl.
*G06F 15/16* (2006.01)
*H04L 29/08* (2006.01)

(52) U.S. Cl.
CPC ............ *H04L 67/104* (2013.01); *H04L 67/06* (2013.01)

(58) Field of Classification Search
CPC .................................................... H04L 67/104
See application file for complete search history.

(56) References Cited

U.S. PATENT DOCUMENTS

| | | | |
|---|---|---|---|
| 8,356,179 B2 * | 1/2013 | Tie ........................ | H04L 9/3213 713/155 |
| 8,625,796 B1 * | 1/2014 | Ben Ayed ........... | H04L 63/0853 380/258 |
| 9,723,003 B1 * | 8/2017 | McClintock ............ | H04L 63/10 |
| 2007/0162961 A1 * | 7/2007 | Tarrance ................. | G06F 21/33 726/5 |
| 2009/0133107 A1 * | 5/2009 | Thoursie ............. | H04L 63/0815 726/6 |
| 2010/0083000 A1 * | 4/2010 | Kesanupalli ............ | G06F 21/32 713/186 |
| 2010/0228989 A1 * | 9/2010 | Neystadt ................. | G06F 21/10 713/185 |
| 2012/0331529 A1 * | 12/2012 | Ibel ...................... | G06F 21/6218 726/4 |
| 2014/0280941 A1 * | 9/2014 | Maguire ................. | H04L 67/10 709/225 |
| 2016/0226973 A1 * | 8/2016 | Appel ................. | H04L 67/1097 |

\* cited by examiner

*Primary Examiner* — Brian Whipple
(74) *Attorney, Agent, or Firm* — Lee & Hayes, PLLC

(57) ABSTRACT

An example peer-to-peer file sharing and collaboration method includes providing a user of a computing device with access to an electronic file via a sharing application, the electronic file being stored in a memory of the computing device. The method also includes receiving an input from the user indicative of a desire to share the electronic file using the sharing application and via a peer-to-peer communication protocol. The method further includes providing, via the communication protocol, a first transformed file generated by the first computing device based on the electronic file, and receiving, via the communication protocol, a second transformed file generated based on the electronic file. In such a method, the second transformed file is different from the first transformed file.

21 Claims, 6 Drawing Sheets

PEER-TO-PEER FILE SHARING AND COLLABORATION

BACKGROUND

Existing computing devices may be used to generate, store, and modify electronic files in a variety of different environments. In some environments, such files may be stored on a server or other computing resource in communication with the computing device via a network. In such environments, the computing device may access the file via the network, and a user may modify the file with the computing device. Users of other computing devices may also be granted access to the file via the network, and in this way, multiple users may collaborate to modify the file when the respective computing devices are connected to the network. In such environments, the users may be granted access to the file once various security requirements have been satisfied, and such security requirements may be facilitated by the network. In some situations, however, access to the network may not be available. In such situations, the users' ability to access and/or modify the electronic file may be hindered.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
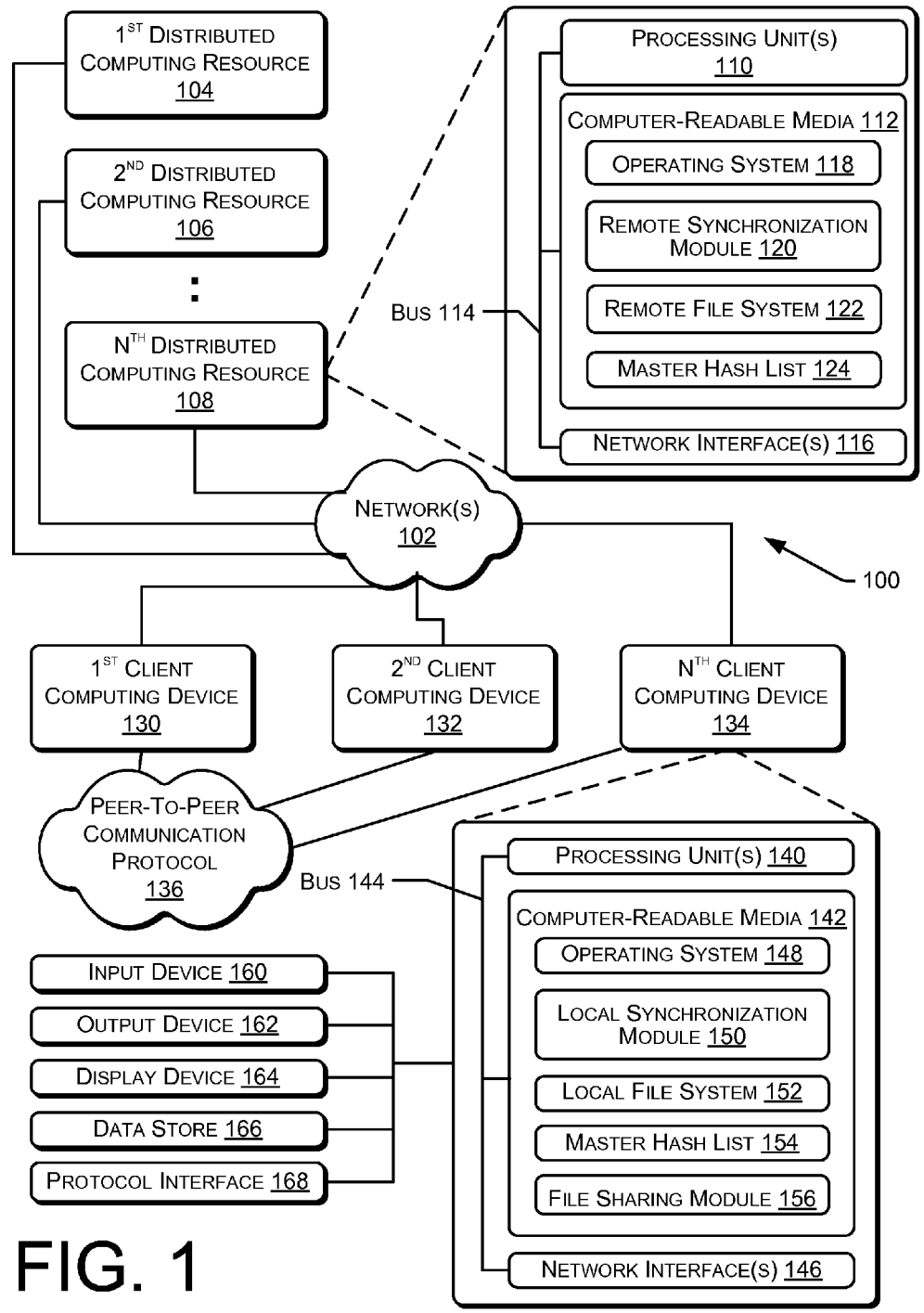
FIG. 1 illustrates an example environment for sharing and/or collaborating on electronic files.

Described herein are systems and processes for sharing and/or collaborating on electronic files, using two or more local computing devices, via a peer-to-peer communication protocol (e.g., over a peer-to-peer connection) that is separate from a public network connection or a private network connection. In various embodiments, users of the computing devices may share such electronic files by way of a secure sharing application that is active on the computing devices. Once active, the sharing application may provide a user of a first computing device with access to one or more electronic files stored locally in a memory of the first computing device. The sharing application may also provide a user interface, via a display of the device, by which the user may consume, review, revise, edit, and/or otherwise modify one or more such electronic files. Additionally, the user interface of the sharing application may provide one or more controls configured to enable sharing of the electronic file via the peer-to-peer communication protocol. As will be described in further detail below, such a protocol may include, among other things, a near field communication (NFC) arrangement, a wireless local area network, a wireless personal area network, and/or other like protocol. In some examples, the protocol may comprise a BLUETOOTH® connection, a NFC connection, a WiFi connection, an infra-red connection, a visible-light connection, a wired connection, an acoustic connection, or other communication connections. Such sharing applications and/or peer-to peer communication protocols may also facilitate secure access, collaboration, and/or sharing of the electronic file between local computing devices when connection to a public or private network is not available.

In exemplary embodiments, the sharing application may enable components of the first computing device to receive various inputs from the user. For example, one of the controls described above may be configured to receive an input from a user of the first computing device indicative of the user's desire to share an electronic file with the second computing device via the peer-to-peer communication protocol. In response to such an input, the first computing device may provide a sharing request to the second computing device via the peer-to-peer communication protocol. If a user of the second computing device accepts such a request, the first computing device may provide one or more packets of information to the second computing device via the protocol. In such examples, the packet of information may include, among other things, a first compressed, copied, reconfigured, and/or otherwise transformed version of the original electronic file. For example, the first computing device may generate such a transformed file in order to facilitate transfer of the file via the peer-to-peer communication protocol.

Upon receiving the packet of information and/or processing the transformed version of the electronic file with the second computing device, the user of the second computing device may begin to consume, edit, revise, and/or otherwise modify the electronic file using the sharing application active on the second computing device. In some examples, the users of the respective computing devices may collaborate so as to jointly modify the electronic file via the sharing application. In some examples, edits made by one user may be actively pushed and/or otherwise transmitted to the other computing device in response to an input from the user. Alternatively, in other examples edits made by the users may be automatically pushed and/or otherwise transmitted to the respective computing devices in real time. In such examples, the timing and/or method of conveying the various edits made by the users may be determined based on, among other things, the type and/or configuration of the peer-to-peer communication protocol.

Once such a sharing or collaboration session is terminated, the first computing device may receive a second packet of information via the protocol, and the second packet of information may include a second transformed file generated by the second computing device. The second transformed file may be generated based on the original electronic file and may include each of the edits made by the various users during the sharing or collaboration session. In this way, once the session is completed, a modified version of the original electronic file may reside on the first electronic device. Additionally, once the session is completed any versions or transformed files residing on the second computing device may be deleted by the sharing application operating on the second computing device.

Since the various computing devices described herein may communicate and/or otherwise connect with each other via a peer-to-peer communication protocol that is separate from and/or outside of the networks described above, such computing devices may not be hampered by unreliable connectivity to such networks for purposes of transferring and/or sharing of electronic files. Additionally, electronic files may be transferred and/or shared via the peer-to-peer communication protocol at higher speeds relative to analogous transfers over the external networks described above. Moreover, since the peer-to-peer communication protocols described herein are operable within a relatively short range with respect to each individual computing device, the methods and processes described herein may allow for improved security over similar methods performed using external networks. As a result, the methods and processes described herein may provide technical and use-based advantages to the user and to the overall file sharing and collaboration system in some situations.

Referring now to FIG. 1, a detailed example of a file sharing and collaboration system is illustrated and is generally designated 100. As depicted, the file sharing system 100 can include at least one network 102 to facilitate communication between distributed computing resources and multiple client computing devices. The local client computing devices may also communicate over a local peer-to-peer network as will be described in more detail. The network 102 may include public networks such as the Internet, private networks such as an institutional and/or personal intranet, or some combination of private and public networks. The network 102 may also include any type of wired network, wireless network, or a combination thereof. Further, the wireless network may include, for example, a satellite network, a cellular network (e.g., 3G, 4G, etc.), a Wi-Fi network, a WiMax network, another wireless network, or a combination thereof. Moreover, the wired network may include an Ethernet connected via Cat-5 cable, twisted pair telephone lines, coaxial cable, fiber optic cable, or a combination thereof. In another implementation, the network 102 may be a wide area network (WAN), a local area network (LAN), or a combination thereof. Further, the network 102 may include a plain-old telephone service (POTS) network.

The network 102 may utilize communications protocols, including packet-based and/or datagram-based protocols such as internet protocol (IP), transmission control protocol (TCP), user datagram protocol (UDP), or other types of protocols. Moreover, the network 102 may also include a number of devices that facilitate network communications and/or form a hardware basis for the networks, such as switches, routers, gateways, access points, firewalls, base stations, repeaters, backbone devices, and the like.

In some examples, the network 102 may further include one or more devices that enable connection to a wireless network, such as a wireless access point (WAP). Additional examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

As further illustrated in FIG. 1, the file sharing system 100 can also include a first distributed computing resource 104, a second distributed resource 106, and an Nth distributed resource 108 connected to the network 102. In various examples, the distributed computing resources 104, 106, 108 may include one or more computing devices that operate in a cluster or other grouped configuration to share resources, balance load, increase performance, provide fail-over support or redundancy, or for other purposes. The distributed computing resources 104, 106, 108 may also include computing devices that may belong to a variety of categories or classes of devices such as traditional server-type devices, desktop computer-type devices, mobile-type devices, special purpose-type devices, embedded-type devices, and/or wearable-type devices.

Thus, the distributed computing resources 104, 106, 108 may include a diverse variety of device types and are not limited to a particular type of device. The distributed computing resources 104, 106, 108 may represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

FIG. 1 further illustrates the details regarding the Nth distributed computing resource 108. It can be appreciated that the first distributed computing resource 104 and the second distributed computing resource 106 may be configured in substantially the same manner as the Nth distributed computing resource 108 and can include all or a combination of any of the components described herein in conjunction with the Nth distributed computing resource 108.

As shown, the Nth distributed computing resource 108 may be any computing device and the Nth distributed computing resource 108 can include one or more processing units 110 operably, or electrically, connected to computer-readable media 112, e.g., via a bus 114. The bus 114 may include one or more of a system bus, a data bus, an address bus, a PCI bus, a Mini-PCI bus, and any variety of local, peripheral, and/or independent buses.

The Nth distributed computing resource 108 may also include one or more network interfaces 116 to enable communications between the Nth distributed computing resource 108 and other computing resources or devices via the network 102. The network interface 116 may include one or more network interface controllers (NICs) or other types of transceiver devices to send and receive communications over a network. In a particular aspect, as illustrated in FIG. 1, executable instructions can be stored on the computer-readable media 112 and those instructions may include, for example, an operating system 118, a remote shared folder and file synchronization module 120, and other modules, programs, or applications that are loadable and executable by the one or more processing units 110.

Alternatively, or in addition, the functionality described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may represent a hybrid device, such as one from ZYLEX or ALTERA that includes a CPU core embedded in an FPGA fabric.

The computer-readable media 112 of the Nth distributed computing resource 108 may also include, or be partitioned with, a remote file system 122 in which a plurality of folders, sub-folders, files, or a combination thereof may be stored. The plurality of folders, sub-folders, and files can include a plurality of shared folders, shared sub-folders, shared files, shared sub-level files, and shared shortcuts. More particularly, the plurality of shared folders, shared sub-folders, shared files, shared sub-level files, and shared shortcuts can include a plurality of remote instances of shared folders, a plurality of remote instances of shared sub-folders, and a plurality of remote instances of shared files.

In particular, the remote file system 122 may utilize a cryptographic hash function, or other hash function, to store and retrieve files and data stored within the remote file system 122. The hash function may include a derivative of the Merkle-Damgard hash function such as MD2, MD4, MD5, MD6, SHA-0, SHA-1, SHA-2, SHA-3, or a combination thereof. In another aspect, the hash function may include a race integrity primitives evaluation message digest (RIPEMD) hash function, RIPEMD-160, or a combination thereof.

FIG. 1 further indicates that the computer-readable media 112 can include a master hash list 124 stored thereon. The master hash list 124 can include a list of folder hashes, sub-folder hashes, and file hashes and may be used to compare a current state of folder hashes, sub-folder hashes, and file hashes thereto in order to determine if the content within the folders, sub-folders, and/or files has changed since the last master hash list was computed and recorded.

For simplicity, other components or features that may be typically associated, or included, with a computing device such as the Nth distributed computing resource 108 are omitted from the depiction of the Nth distributed computing resource 108 in FIG. 1. These other components or features may include, but are not limited to, an A/C power supply, a D/C power supply, various connector ports, various cords, various LED indicators, speakers, a housing, a chassis, fans, heat sinks, input devices, output devices, display devices, etc.

FIG. 1 further indicates that the file sharing system 100 can include a first client computing device 130, a second client computing device 132, and an Nth client computing device 134. The client computing devices 130, 132, 134 may belong to a variety of categories or classes of devices, which may be the same as or different from the distributed computing resources 104, 106, 108. These categories or classes of devices may include traditional client-type devices, desktop computer-type devices, mobile-type devices, special purpose-type devices, embedded-type devices, and/or wearable-type devices. Further, the client computing devices 130, 132, 134 may include a diverse variety of device types and are not limited to any particular type of device.

For example, the client computing devices 130, 132, 134 may also include, but are not limited to, computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

Moreover, an entity, such as a user, may be associated with each, or any, of the client computing devices 130, 132, 134. The entity may include a particular user and one or more designees of the user such as an assistant of the user, a supervisor of the user, a spouse of the user, a parent of the user, and/or another entity to whom the user grants permission to access the client computing device 130, 132, 134.

Each of the client computing devices 130, 132, 134 may be connectable to a peer-to-peer communication protocol 136 (protocol 136), and the protocol 136 may enable communication between the respective client computing devices 130, 132, 134. In example embodiments, the protocol 136 may comprise one or more of a NFC arrangement, a wireless local area network, a wireless personal area network, and/or other like protocol. In some examples, the protocol 136 may comprise a BLUETOOTH® connection, a NFC connection, a WiFi connection, an infra-red connection, a visible-light connection, a wired connection, an acoustic connection, or other communication connections, some of which may be close-range connections. In such embodiments, the protocol 136 may enable packet-based and/or datagram-based file sharing and/or transfer. In such examples, the protocol 136 may comprise an internet protocol (IP), transmission control protocol (TCP), user datagram protocol (UDP), or other types of protocols. Moreover, the computing devices 130, 132, 134 may also include a number of components that facilitate communication, such as communication between two or more of the respective computing devices 130, 132, 134 via the protocol 136 and without connection to the network 102. For example, two or more of the respective computing devices 130, 132, 134 may transmit signals, files, and/or packets of information therebetween via the protocol 136.

FIG. 1 further illustrates the details regarding the Nth client computing device 134. It can be appreciated that the first client computing device 130 and the second client computing device 132 may be configured in the same manner as the Nth client computing device 134 and may include all or a combination of any of the components described herein in conjunction with the Nth client computing device 134.

As depicted, the Nth client computing device 134 may be any computing device and the Nth client computing device 134 can include one or more processing units 140 operably, or electrically, connected to computer-readable media 142, e.g., via a bus 144. The bus 144 may include one or more of a system bus, a data bus, an address bus, a PCI bus, a Mini-PCI bus, and any variety of local, peripheral, and/or independent buses.

The Nth client computing device 134 may also include one or more network interfaces 146 to enable communications between the Nth client computing device 134 and other computing resources or devices via the network 102. The network interface 146 may include one or more network interface controllers (NICs) or other types of transceiver devices to send and receive communications over a network. In a particular aspect, executable instructions can be stored on the computer-readable media 142 of the Nth client computing device 134 and those instructions, as illustrated in FIG. 1, may include, for example, an operating system 148, a local shared folder and file synchronization module 150, and other modules, programs, or applications that are loadable and executable by the one or more processing units 140.

Alternatively, or in addition, the functionally described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may represent a hybrid device, such as one from ZYLEX or ALTERA that includes a CPU course embedded in an FPGA fabric.

The computer-readable media 142 of the Nth client computing device 134 may also include, or be partitioned with, a local file system 152 in which a plurality of folders, sub-folders, files, or a combination thereof may be stored. The plurality of folders, sub-folders, and files can include a plurality of shared folders, shared sub-folders, shared files, shared sub-level files, and shared shortcuts. More particularly, the plurality of shared folders, shared sub-folders, shared files, shared sub-level files, and shared shortcuts can include a plurality of local instances of shared folders, a plurality of local instances of shared sub-folders, and a plurality of local instances of shared files.

In a particular aspect, the local file system 152 may utilize a cryptographic hash function, or other hash function, to store and retrieve files and data stored within the local file system 152. The hash function may include a derivative of the Merkle-Damgard hash function such as MD2, MD4, MD5, MD6, SHA-0, SHA-1, SHA-2, SHA-3, or a combination thereof. In another aspect, the hash function may include a race integrity primitives evaluation message digest (RIPEMD) hash function, RIPEMD-160, or a combination thereof.

As further illustrated in FIG. 1, the computer-readable media 142 can include a master hash list 154 stored thereon. The master hash list 154, as described herein, can include a list of folder hashes, sub-folder hashes, and file hashes and may be used to compare a current state of folder hashes, sub-folder hashes, and file hashes thereto in order to determine if the content within the folders, sub-folders, and/or files has changed since the last master hash list was computed and recorded.

The master hash list 154 can be a copy of the master hash list 124 stored within the Nth distributed computing resource 108. At times, the master hash lists 124, 154 can be identical. However, as folders, sub-folders, files, or a combination thereof are altered at the various client computing devices 130, 132, 134, the master hash lists 124, 154 may be different before being synchronized with each other.

The computer-readable media 142 can also include a file sharing module 156 stored thereon. The file sharing module 156 may be executable by the processing unit 140 to assist in transferring, for example, signals, files, and/or packets of information between the respective client computing devices 130, 132, 134 via the protocol 136. For example, the file sharing module 156 may include one or more file sharing applications which, when executed by the processing unit 140 may provide a user interface on the respective client computing device 130, 132, 134. As will be described with respect to FIGS. 2-5 below, the user interface may be configured to receive input from a user of the respective client computing device 130, 132, 134 indicative of a desire to share a particular electronic file stored in the computer-readable media 142.

The file sharing module 156 may also be configured to generate one or more transformed files in response to such an input. In example embodiments, such transformed files may comprise a compressed version of the particular electronic file, a converted version of the particular electronic file, a duplicate version (e.g., a copy) of the particular electronic file, and the like. The file sharing module 156 may also be configured to provide the transformed file for sharing with one or more additional client computing devices via the protocol 136. For example, the file sharing module 156 may provide a packet of information for sharing with at least one of the client computing devices 132, 134 via the protocol 136, and in such examples, the packet of information may include at least the transformed file. In some examples, the transformed file may be a smaller, more easily transferable file than the particular electronic file with which it corresponds. Thus, in such embodiments, generating and providing the transformed file for sharing with one or more additional computing devices may reduce the bandwidth required for and may increase the transfer speed of sharing files between client computing devices 130, 132, 134.

Still referring to FIG. 1, the Nth client computing device 134 can also include an input device 160, an output device 162, a display device 164, or a combination thereof connected thereto. In particular, the input device 160, the output device 162, and the display device 164 can be connected to the bus 144. The input device 160, the output device 162, and the display device 164 may provide a user with the ability to communicate with the Nth client computing device 134. The input device 160 may include a mouse, a keyboard, a microphone, a touch screen, a joystick, a hand held controller, a light pen, a track ball, a scanner, a graphic tablet, magnetic ink card reader (MICR), an optical character reader (OCR), a bar code reader, an optical mark reader, or a combination thereof. The output device 162 may include a printer, a speaker, a haptic device, or a combination thereof. The display device 164 may include a screen, a monitor, a projector, or a combination thereof. In example embodiments, the display device 164 may comprise a touch-sensitive display. Such displays may include, for example, one or more light sensors, capacitance sensors, or other sensors configured to detect touch input on a surface of the display device 164.

FIG. 1 further indicates that the file sharing system 100 can include a data store 166 connected to the Nth client computing device 134. It can be appreciated that in an alternative aspect, the shared folder and file local synchronization module 150, the local file system 152, the master hash list 154, the file sharing module 156, or a combination thereof may be located within the data store 166. In various aspects and examples, the data store 166 includes data storage such as a database, data warehouse, or other type of structured or unstructured data storage. In some examples, the data store 166 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

The computer-readable media 142 may comprise any memory, computer storage media, and/or communication media. Computer storage media may include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 112, 142 may be examples of computer storage media similar to data store 166.

Thus, the computer-readable media 112, 142 and/or data store 166 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), mask read-only memory (MROM), programmable read-only memory (PROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that may be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The Nth client computing device 134 may also include one or more protocol interfaces 168 to enable communications between the Nth client computing device 134 and other computing resources or devices via the protocol 136. The protocol interface 168 may include one or more interface controllers or other types of transceiver devices to send and receive communications via the protocol 136. For example, the protocol interface 168 may comprise one or more short-wavelength UHF radio antennae configured to send and/or receive files, signals, packets, and/or other information via a wireless personal area network and/or via a wireless local area network. Additionally or alternatively, the protocol interface 168 may comprise one or more antennae configured to generate and/or detect a modulated electric field or a modulated magnetic field. In such embodiments, the protocol interface 168 may be configured to send and/or receive files, signals, packets, and/or other information via NFC.

For simplicity, other components or features that may be typically associated, or included, with a computing device such as the Nth client computing device 134 are omitted from the depiction of the Nth client computing device 134 in FIG. 1. These other components or features may include, but are not limited to, an A/C power supply, a D/C power supply, various connector ports, various cords, various LED indicators, a housing, a chassis, fans, heat sinks, etc.

The computer-readable storage media 112, 142 and/or data store 166 may be used to store any number of functional components that are executable by the one or more processing units 110, 140. In many implementations, these functional components comprise instructions or programs that are executable by the one or more processing units 110, 140 and that, when executed, implement operational logic for performing the operations attributed to the file sharing system 100. Functional components of the file sharing system 100 that may be executed on the one or more processing units 110, 140 for implementing the various functions and features related to sharing various files and facilitating local collaboration between two or more client computing devices 130, 132, 134, as described herein, include the remote shared folder and file synchronization module 120 within the Nth distributed computing resource 108, the local shared folder and file synchronization module 150 within the Nth client computing device 134, and the file sharing module 156 on each of the client computing devices 130, 132, 134.

In an implementation, the various modules 120, 150, 156 may include computer-readable instructions that are executable by the processing units 110, 140 to perform operations related to the sharing, collaboration on, and/or synchronization of shared folders and files among several client computing devices 130, 132, 134 and at least one distributed computing resource 104, 106, 108.

Figure 2:
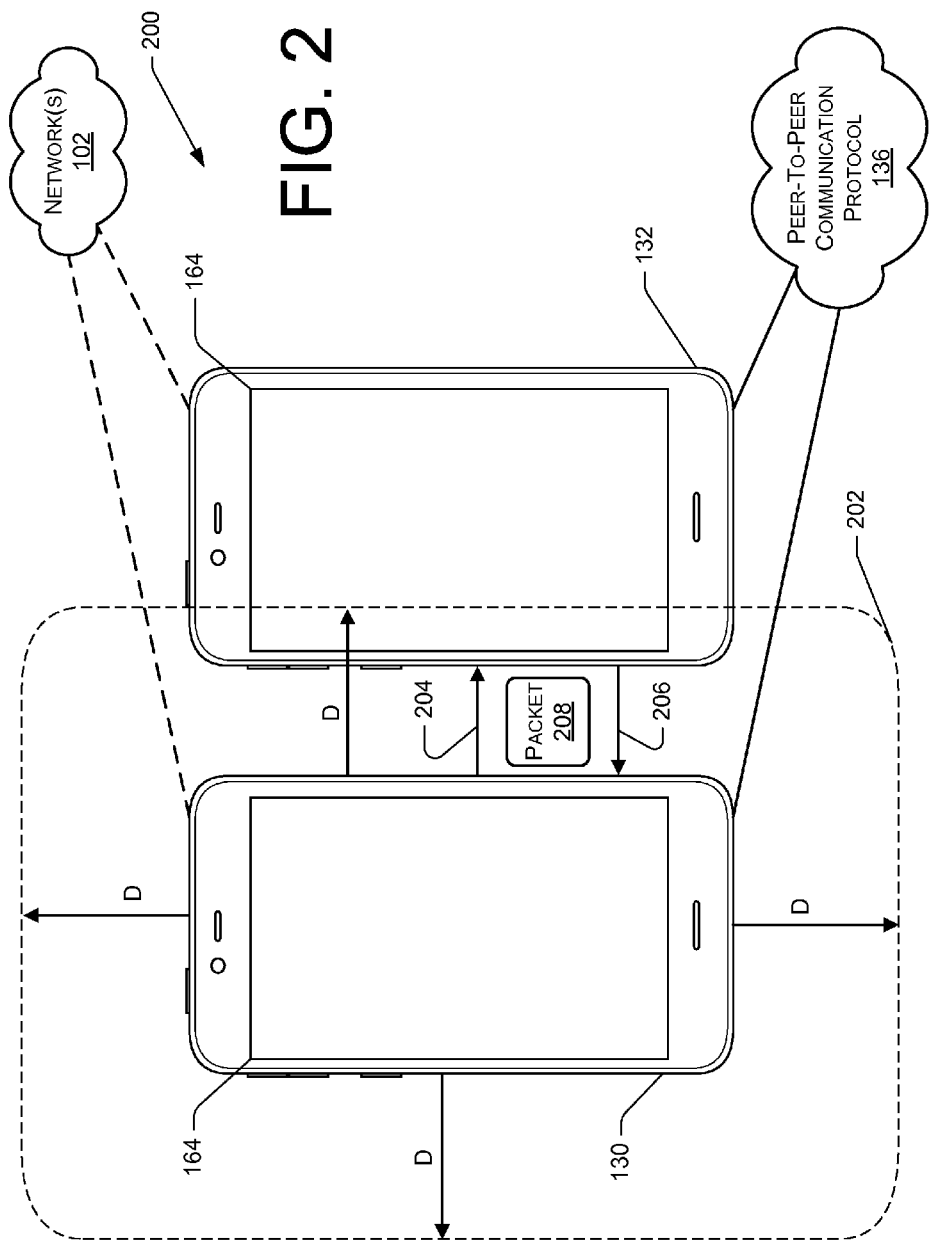
FIG. 2 illustrates another example environment for sharing and/or collaborating on electronic files, such as with local computing devices.

Referring now to FIG. 2, an example environment for sharing files is shown and is generally designated 200. The environment 200 illustrated in FIG. 2 may include one or more of the client computing devices 130, 132, 134 described above with respect to FIG. 1. In the environment 200 shown in FIG. 2, at least one of the client computing devices 130, 132 may be connected to and/or otherwise in communication with the network 102. Alternatively, in such an environment 200 one or both of the client computing devices 130, 132 may not be able to connect to and/or otherwise communicate with the network 102 due to various environmental factors. For example, such an environment 200 may comprise one or more locations located remote from and/or otherwise outside of the range of the network 102, and in such an environment 200 connectivity to the network 102 may be intermittent and/or not possible. Accordingly, in such an environment 200 the first client computing device 130 may be at least temporarily connected to and/or otherwise in communication with the second client computing device 132 via the peer-to-peer communication protocol 136. While the first client computing device 130 is in communication with the second client computing device 132 via the protocol 136, the computing devices 130, 132 may be configured to share files, signals, packets, and/or other information via the protocol 136 and without connecting to the network 102.

Depending on the type of peer-to-peer protocol 136 utilized in the environment 200, connectivity between the first and second client computing devices 130, 132 may be dependent upon the proximity between the client computing devices 130, 132. For example, in embodiments in which the protocol 136 comprises a wireless network such as a wireless local area network or a wireless personal area networks, the protocol interface 168 associated with the first client computing device 130 may communicate, bond, and/or pair with the corresponding protocol interface 168 associated with the second client computing device 132 when the second client computing device 132 is at least partially disposed less than first distance from the first client computing device 130. In such embodiments, the protocol 136 may include a Bluetooth® connection, a Wi-Fi connection, an infra-red connection, a visible-light connection, a wired connection, an acoustic connection, or other communications connection, and the first distance may be less than approximately 4 meters. It is understood that in further embodiments, the first distance may be greater than approximately 4 meters.

In additional embodiments in which the protocol 136 comprises a NFC connection, a protocol interface 168 associated with the first client computing device 130 may communicate and/or connect with a corresponding protocol interface 168 associated with the second client computing device 132 when the second client computing device 132 is at least partially disposed less than a second distance from the first client computing device 130. In such embodiments, the second distance may be less than approximately 10 centimeters. Alternatively, in further embodiments, the second distance may be greater than approximately 10 centimeters.

In any of the embodiments described herein, the first or second distances described above may form a zone 202 surrounding one or both of the client computing devices 130, 132. For example, as shown in FIG. 2 the zone 202 may extend a distance D (i.e., either the first distance or the second distance described above) in every direction from the outer surface of the first client computing device 130. It is understood that although FIG. 2 illustrates a substantially two-dimensional zone 202 extending from the first client computing device 130, such a zone 202 may also extend a distance D from a top surface and a bottom surface of the client computing device 130 (i.e., out of and into the page, respectively). When the second client computing device 132 is brought at least partially within the zone 202 of the first client computing device 130, the protocol interface 168 associated with the first client computing device 130 may communicate and/or connect with a corresponding protocol interface 168 associated with the second client computing device 132.

While a connection is formed between the first and second client computing devices 130, 132 the file sharing module 156 of the first client computing device 130 may generate one or more signals 204 containing files, signals, packets, and/or other information, and may transmit such signals 204 to the second client computing device 132 via the protocol 136 using the protocol interface 168 of the first client computing device 130. Likewise, the second client computing device 132 may generate one or more signals 206 containing files, signals, packets, and/or other information, and may transmit such signals 206 to the first client computing device 130 via the protocol 136 and using the protocol interface 168 of the second client computing device 132. FIG. 2 illustrates an example packet 208 for discussion purposes.

In example embodiments the packet 208 may include, among other things, one or more electronic files, corresponding transformed files, tokens, and/or other information. For example, the packet 208 may include one or more transformed files generated by the file sharing module 156 of the first client computing device 130, and the transformed file may be transmitted from the first client computing device 130 to the second client computing device 132 with, within, and/or otherwise via the packet 208. In such embodiments, upon receiving the transformed file, a file sharing module 156 of the second client computing device 132 may open, decompress, and/or otherwise process the received transformed file such that the original electronic file may be presented to a user of the second computing device 132.

Figure 3:
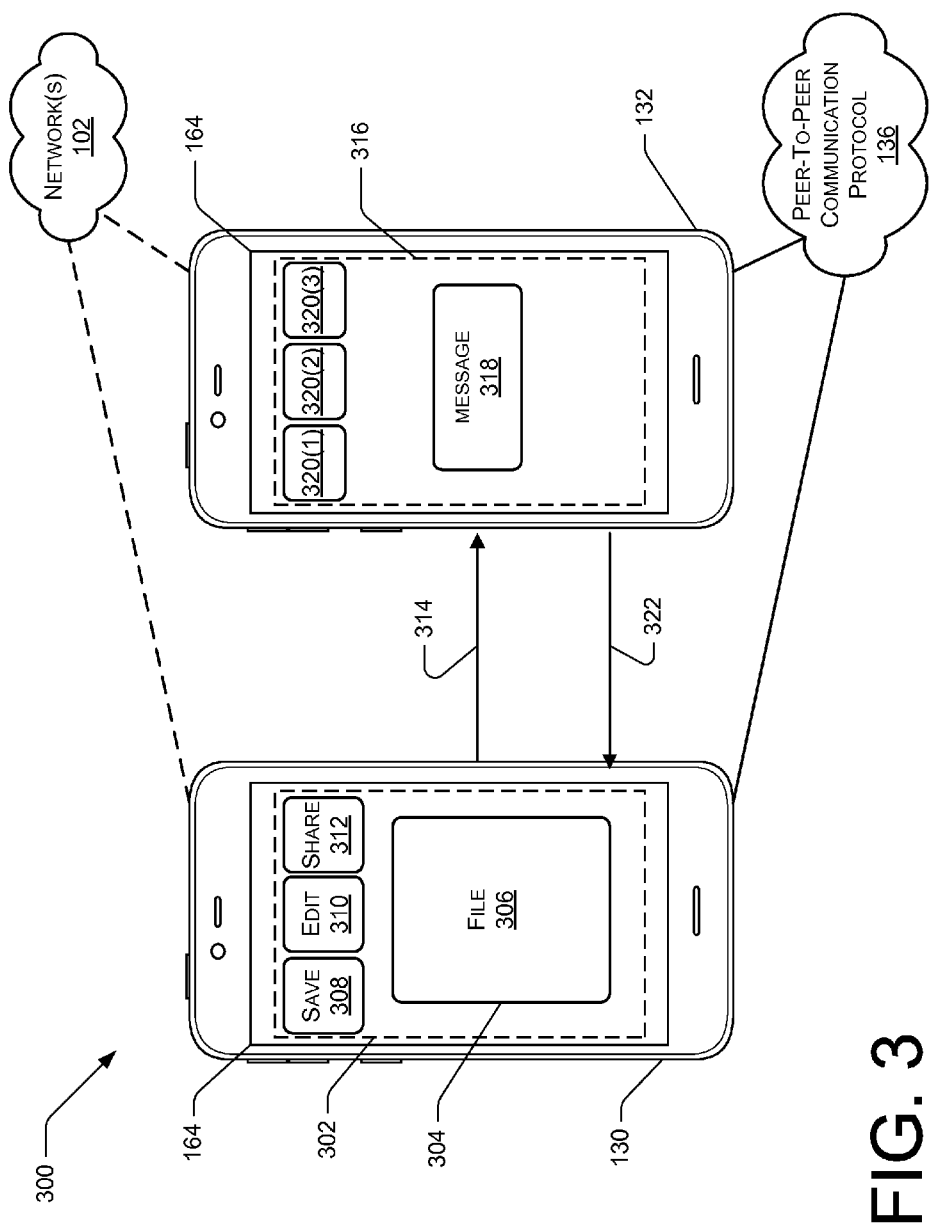
FIG. 3 illustrates a further example environment for sharing and/or collaborating on electronic files with the local computing devices of FIG. 2.

FIG. 3 illustrates an additional environment 300 of the present disclosure in which, for example, the file sharing module 156 of the first client computing device 130 has activated a sharing application on the first client computing device 130. Such a sharing application may provide a user of the first client computing device 130 with access to one or more electronic files stored in the computer readable media 142 and/or other memory of the first computing device 130. For example, activation of such a sharing application may cause the file sharing module 156 to provide and/or otherwise present a user interface 302 via the display device 164. Such a user interface 302 may include, for example, a visual representation 304 of at least one electronic file 306. In example embodiments, the electronic file 306 may be a particular electronic file 306 selected from a plurality of electronic files stored in the computer-readable media 142 for sharing with the second client computing device 132. For example, in some embodiments the user interface 302 may present one or more folders, file trees, databases, and/or other file organization structures from which a user of the first client computing device 130 may select the electronic file 306. In some examples, the visual representation 304 of the file 306 may be displayed via the display device 164 in response to such selection.

The user interface 302 may also include one or more controls 308, 310, 312 configured to receive input from the user and to direct such input to, for example, the file sharing module 156 and/or the protocol interface 168. For example, one of the controls may comprise a save control 308 configured to receive an input from the user indicative of a desire to save the file 306 and/or one or more modifications made to the file 306 to the computer readable media 142. Additionally, when the network interface 146 of the first client computing device 130 is able to connect to the network 102, the save control 308 may enable the user to save and/or transmit the file 306 to the computer readable media 112 of one or more of the distributed computing resources 104, 106, 108.

In addition, one of the controls may comprise an edit control 310 configured to receive an input from the user indicative of a desire to modify and/or otherwise edit the electronic file 306. For example, in response to receiving such an input the edit control 310 may provide the user with a plurality of tools via the user interface 302 configured to make various modifications to the file 306. Such tools may include, for example, a cut, paste, draw, delete, and/or other tool configured to modify text or images. Such tools may also include, for example, a keyboard, a number pad, and/or other tool configured to assist the user in adding further content to the file 306.

A further one of the controls may comprise a share control 312 configured to receive an input from the user indicative of a desire to share the electronic file 306 with the second computing device 132. For example, receiving an input from the user via the share control 312 of the user interface 302 may cause the file sharing module 156 of the first client computing device 130 to generate a signal 314 and to provide the signal to the second client computing device 132 via the protocol 136 using the protocol interface 168 of the first client computing device 130.

In example embodiments a file sharing module 156 of the second client computing device 132 may activate a corresponding sharing application on the second client computing device 132. For example, activation of such a sharing application may cause the file sharing module 156 of the second client computing device 132 to provide and/or otherwise present a user interface 316 via the display device 164. In example embodiments, upon receiving the signal 314 from the first client computing device 130, the file sharing module 156 of the second client computing device 132 may cause the display device 164 to display a message 318 via the user interface 316. In example embodiments, the message 318 may comprise a request and/or a notification to a user of the second client computing device 132 indicating that the user of the first client computing device 130 desires to share the file 306 via the protocol 136.

The user interface 316 may also include one or more controls 320(1), 320(2), 320(3) configured to receive input from the user and to direct such input to, for example, the file sharing module 156 and/or the protocol interface 168 of the second client computing device 132. For example, one of the controls 320(1), 320(2), 320(3) may comprise a save control, an edit control, a share control, and/or any other controls similar to those described above with respect to the user interface 302 of the first client computing device 130. Additionally or alternatively, at least one of the controls may comprise an accept control 320(1) and another one of the controls may comprise a decline control 320(2). Such controls may be configured to receiver a user input indicative of a desire to accept a file sharing request received via the signal 314 or to deny such a request. In such embodiments, receiving an input from a user of the second client computing device 132 via either the accept control 320(1) or the decline control 320(2) may cause the file sharing module 156 of the second client computing device 132 to generate a signal 322 and to provide the signal 322 to the first client computing device 130 via the protocol 136 using the protocol interface 168 of the second client computing device 132. Such a signal 322 may comprise an indication that the user of the second client computing device 132 either accepts or declines the request to share electronic file 306. In some embodiments, receiving such a signal 322 may cause the file sharing module 156 of the first client computing device 130 to provide a corresponding message (not shown) to the user of the first client computing device 130 via the user interface 302.

Figure 4:
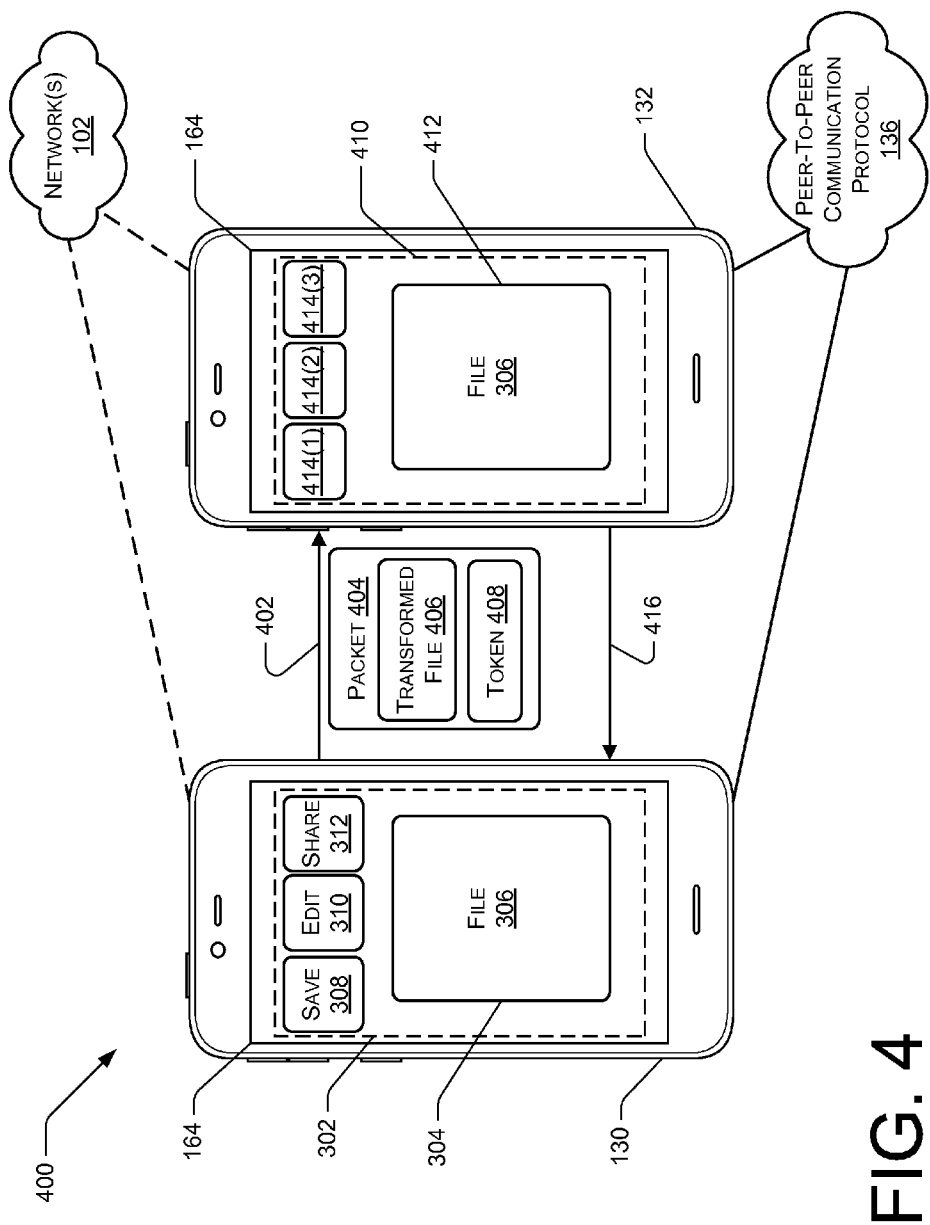
FIG. 4 illustrates another example environment for sharing and/or collaborating on electronic files with the local computing devices of FIG. 2.

FIG. 4 illustrates a further example environment 400 of the present disclosure. The example environment 400 may be representative of an environment in which the signal 322 described above with respect to FIG. 3 comprises an indication that the user of the second client computing device 132 accepts a request to share electronic file 306. In such an environment 400, receiving such a signal 322 may cause the file sharing module 156 of the first client computing device 130 to generate a signal 402 that includes a plurality of information, such as in the form of a packet 404, that may be processed by the file sharing module 156 of the second client computing device 132 in order to save the file 306 locally in a computer-readable media 142 of the second client computing device 132 and/or to provide the file 306 to the user of the second client computing device 132 for editing, sharing and/or collaboration. In such an example embodiments, the packet 404 may comprise a file and/or other electronic vehicle for transmitting such information between computing devices via the protocol 136.

In an example embodiment, receiving such a signal 322 may cause the file sharing module 156 of the first client computing device 130 to generate a transformed file 406. In some examples such a transformed file 406 may comprise a compressed version of the electronic file 306, a converted version of the electronic file 306, a duplicate version (e.g., a copy) of the electronic file 306, and the like. In some examples, the transformed file 406 may be a smaller, more easily-transferable file than the full-size electronic file 306 residing on the first client computing device 130. The transformed file 406 may include rich text, plain text, or other components or formats. Thus, generating and providing the transformed file 406 for sharing with the second client computing device 132 may reduce the bandwidth required for and may increase the transfer speed of sharing the file 306 between client computing devices 130, 132 via the protocol 136.

In example embodiments, one or more packets 404 of the present disclosure may also include a security token 408. Such a security token 408 may uniquely identify the respective client computing device that generates and/or other provides the particular security token 408. For example, the security token 408 may include one or more security keys or other information identifying the first client computing device 130 and indicating that the transformed file 406 and/or other information included in the packet 404 originated at the first client computing device 130. Such tokens 408 may be useful in embodiments in which one or both of the files 306, 406 is cryptographically protected. For example, in embodiments in which the token 408 comprises a unique first client computing device identifier, one or more remote distributed computing resources 104, 106, 108 may compare such an identifier with saved identification information associated with the first client computing device 130. Such a comparison may take place, for example, when connectivity to the network 102 is available. If the identifier matches the saved identification information, the one or more remote distributed computing resources 104, 106, 108 may grant the second client computing device 132 and/or a user of the second client computing device 132 access to the transformed file 406 and/or the original electronic file 306. For example, if the identifier matches the saved identification information, the one or more remote distributed computing resources 104, 106, 108 may send a signal to the first and/or second client computing devices 130, 132 indicating that secured access to the transformed file 406 and/or the electronic file 306 by the second computing device 132 has been approved.

In additional embodiments in which connectivity to the network 102 is not available, each client computing device 130, 132 may verify the other, for security purposes, before access to the transformed file 406 and/or the electronic file 306 by the second client computing device 132 is granted. For example, upon receiving a first token 408 from the first client computing device 130, the second client computing device 132 may compare a unique first client computing device identifier included in the token 408 to identification information associated with the first client computing device 130. Such identification information may be stored locally on the second client computing device 132. If the identifier matches the saved identification information, the second client computing device 132 may send a signal to the first client computing device 130 including a second token having a unique security key or other second client computing device identifier. Upon receiving the second token, the first client computing device 130 may compare the unique second client computing device identifier included in the second token to identification information associated with the second client computing device 132. Such identification information may be stored locally on the first client computing device 130. If the identifier of the second token matches the saved identification information, the first client computing device 130 may provide the transformed file 406 to the second client computing device 132. In further embodiments, the transformed file 406 may be password-protected, encrypted, and/or otherwise secured. In such embodiments, a user of the second client computing device 132 may not access the transformed file 406 and/or the original electronic file 306 without first entering, for example, a password, pin, and/or other decryption code via a user interface 410 of the second client computing device 132.

In the example environment 400, the file sharing module 156 of the second client computing device 132 may receive the packet 404, and once the user of the second client computing device 132 gains appropriate access to the transformed file 406, the file sharing module 156 may open, decompress, and/or otherwise process the transformed file 406 such that a visual representation 412 of the original electronic file 306 is presented to the user via the user interface 410. The file sharing module 156 may also present a plurality of additional controls 414(1), 414(2), 414(3) to the user via the user interface 410, and in example embodiments such controls 414(1), 414(2), 414(3) may enable the user to edit and/or otherwise modify the file 306 via the user interface 410. In example embodiments one or more of the controls 414(1), 414(2), 414(3) may be substantially similar to and/or the same as at least one of the controls 308, 310, 312 described above.

Further, in some embodiments at least one of the controls 414(1), 414(2), 414(3) may enable real-time collaboration between users of the first and second client computing devices 130, 132. For example, one or more of the controls 414(1), 414(2), 414(3) may enable the respective visual representations 304, 412 of the file 306 to be displayed via the user interfaces 302, 410 at the same time. In such examples, modifications to the file 306 made as a result of corresponding edits, revisions, changes, or other collaborative input received from a user via the first client computing device 130 may appear substantially simultaneously, in real time, in the visual representation 412 of the file 306 presented via the user interface 410. Likewise, modifications to the file 306 made as a result of corresponding edits, revisions, changes, or other collaborative input received from a user via the second client computing device 132 may appear substantially simultaneously, in real time, in the visual representation 304 of the file 306 presented via the user interface 302. In various examples of the present disclosure, such modifications may be directed from the second client computing device 132 to the first client computing device 130 via one or more signals 416 generated by the file sharing module 156 of the second client computing device 132. Likewise, such modifications may also be directed from the first client computing device 130 to the second client computing device 132 via one or more of the signals 402 generated by the file sharing module 156 of the first client computing device 130.

Figure 5:
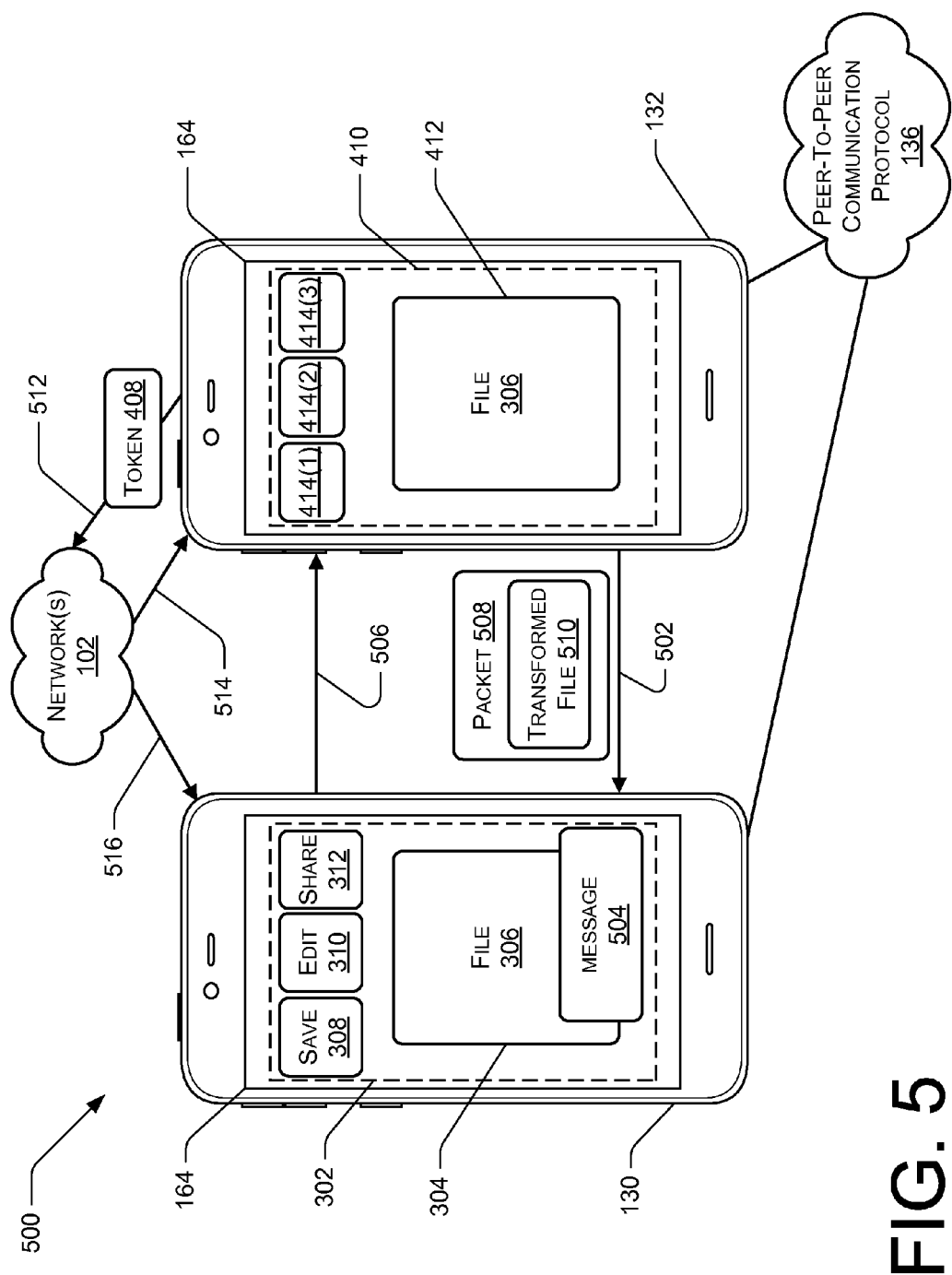
FIG. 5 illustrates a further example environment for sharing and/or collaborating on electronic files with the local computing devices of FIG. 2.

FIG. 5 illustrates a further environment 500 in which, after the file 306 has been shared with and/or modified by a user of the second client computing device 132, the user may enter one or more inputs via one of the controls 414(1), 414(2), 414(3) indicative of a desire to terminate a connection between the computing devices 130, 132 and/or otherwise terminate a sharing or collaboration session between the two computing devices 130, 132. In such an example, such an input may cause the file sharing module 156 of the second client computing device 132 to generate a signal 502 including information indicative of such a desired termination. The signal 502 may be transferred from the file sharing module 156 of the second client computing device 132, via the protocol 136, to the file sharing module 156 of the first client computing device 130. In response to receiving such a signal 502, the file sharing module 156 of the first client computing device 130 may generate one or more messages 504 and may present such messages 504 via the user interface 302. In example embodiments, such messages 504 may comprise an indication to the user of the first client computing device 130 and/or a request to the user of the first client computing device 130 to terminate the sharing or collaboration session.

The user of the first client computing device 130 may accept or decline the request by providing an input via, for example, one or more controls of the user interface 302, and an indication of the user's decision to accept or decline the request may be provided to the second client computing device 132 via a signal 506 generated by the file sharing module 156 of the first client computing device 130. In example embodiments, if the user of the first client computing device 130 accepts termination of the sharing or collaboration session, the file sharing module 156 of the second client computing device 132 may generate a packet 508 including, for example, a second transformed file 510. In such examples, the second transformed file 510 may be generated based on, and may incorporate each of, the modifications to the electronic file 306 received during the sharing or collaboration session. Similar to the transformed file 406 described above, the second transformed file 510 may comprise a compressed version of the electronic file 306, a converted version of the electronic file 306, a duplicate version (e.g., a copy) of the electronic file 306, and the like. In such examples, the file sharing module 156 may generate the second transformed file 510 by copying the modified file 306, compressing the modified file 306, converting the modified file 306 into a different file format, and/or otherwise processing the modified file 306 into a suitable form for transfer in the packet 508 via the protocol 136. The second transformed file 510 may be a smaller, more easily transferable file than, for example, the full-size modified electronic file 306 residing on the second client computing device 132 at the end of the sharing or collaboration session.

Upon receiving the second transformed file 510, the file sharing module 156 of the first client computing device 130 may open, decompress, convert, and/or otherwise process the second transformed file 510 to generate a modified file 306, and the file sharing module 156 may direct the modified file 306 to the data store 166 and/or other portions of the computer-readable media 142 for storage therein. Additionally or alternatively, the file sharing module 156 may direct the modified file 306 to the computer-readable media 112 of a distributed computing resource 104, 106, 108 via the network 102 when connectivity to the network 102 is available.

As noted above, in some embodiments an initial packet 404 provided by the first client computing device 130 may include one or more security tokens 408 including a security key and/or other information uniquely identifying the first client computing device 130. As shown in FIG. 5, in some embodiments the second client computing device 132 may generate a signal 512 including the token 408, and may direct the signal 512 to, for example, one or more of the distributed computing resources 104, 106, 108 via the network 102 when connectivity to the network 102 is available. Upon receiving the token 408, the one or more distributed computing resources 104, 106, 108 may compare the security key and/or other information included in the token 408 to stored information identifying, for example, the first client computing device 130. If the security key and/or other information included in the token 408 matches the stored information, the one or more distributed computing resources 104, 106, 108 may verify that it was proper to grant the second client computing device 132 and/or a user of the second client computing device 132 access to the original file 306. In such situations, the one or more distributed computing resources 104, 106, 108 may retroactively grant the second client computing device 132 and/or a user of the second client computing device 132 access to the original file 306. Additionally, in some examples such granted access may be maintained for future sharing and/or collaboration sessions between the first and second client computing devices 130, 132 and/or particular users thereof. For example, the one or more distributed computing resources 104, 106, 108 may direct a signal 514 to the second client computing device 132 indicating that such access has been granted, and may also direct a similar signal 516 to the first client computing device 130 indicating that such access has been granted.

Figure 6:
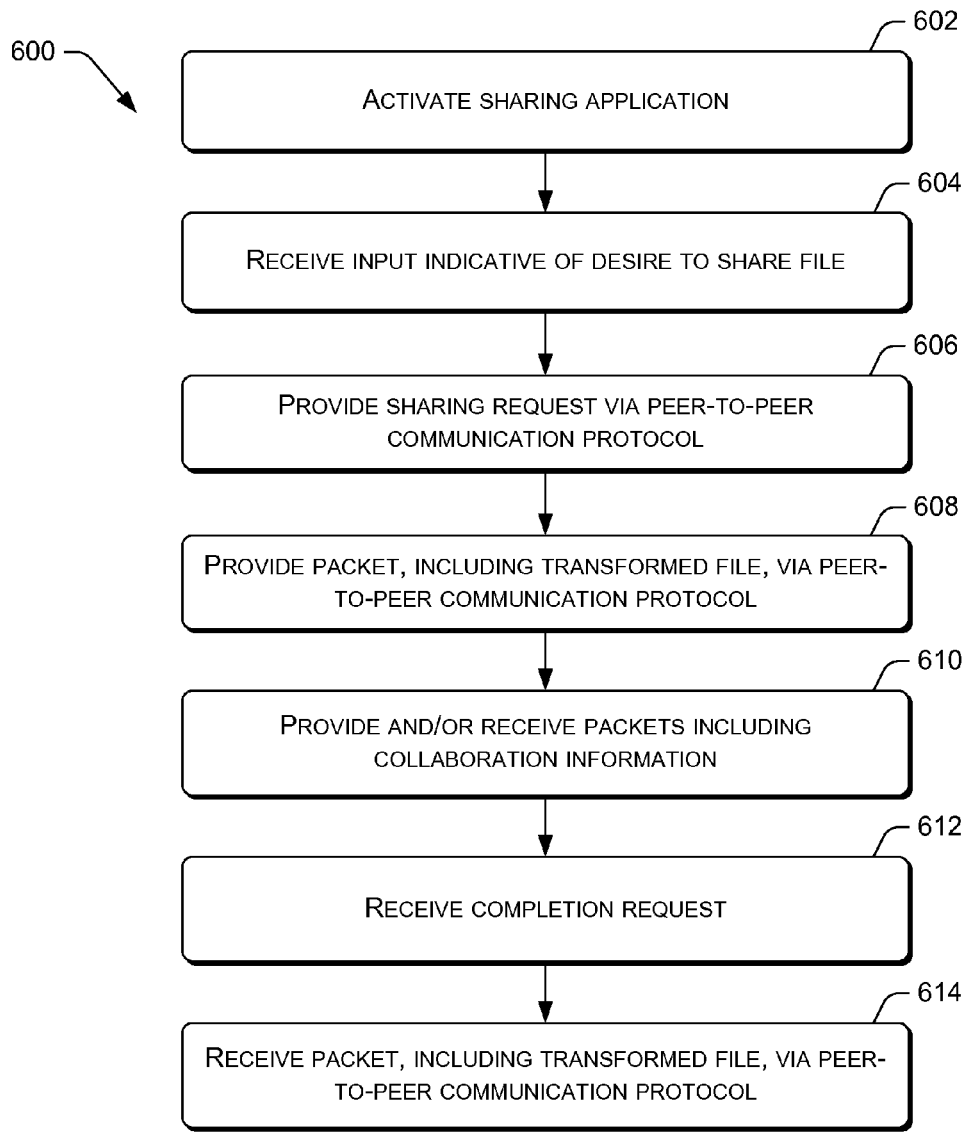
FIG. 6 illustrates a flow diagram of an example process for sharing and/or collaborating on electronic files.

FIG. 6 illustrates various processes associated with sharing and/or collaborating on one or more electronic files via a peer-to-peer communication protocol that is separate from, disconnected from, and/or otherwise outside of the network 102 described above. FIG. 6, for example, illustrates a flow diagram of an example method 600 of sharing and/or collaborating on one or more electronic files using two or more client computing devices. The example method 600 is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the methods herein are described with reference to the frameworks, architectures and environments described in the examples herein, although the methods may be implemented in a wide variety of other frameworks, architectures or environments.

The description of the various methods may include certain transitional language and directional language, such as "then," "next," "thereafter," "subsequently," "returning to," "continuing to," "proceeding to," etc. These words, and other similar words, are simply intended to guide the reader through the graphical illustrations of the methods and are not intended to limit the order in which the method steps depicted in the illustrations may be performed.

Additionally, one or more of the various method steps depicted in FIG. 6 may be performed by the one or more of the distributed computing resources 104, 106, 108 (FIG. 1) or the client computing devices 130, 132, 134 (FIG. 1) in order to facilitate sharing files stored therein or in a memory device accessible thereto. Such sharing of and/or collaboration on a particular electronic file may take place in a sharing or collaboration session between two or more of the client computing devices 130, 132, 134 described herein via the peer-to-peer communication protocol 136. In particular, one or more of the various method steps depicted in FIG. 6 may be performed by the remote shared folder and file synchronization module 120 (FIG. 1) within the distributed computing resources 104, 106, 108 (FIG. 1), the local shared folder and file synchronization module 150 (FIG. 1) within the client computing device 130, 132, 134 (FIG. 1), the file sharing module 156 and/or the protocol interface 168 within the client computing device 130, 132, 134, or a combination thereof.

As stated above, FIG. 6 illustrates a flow diagram of an example method 600 of sharing and/or collaborating on an electronic file. Beginning at 602, the method 600 includes activating a sharing application on the first client computing device 130. For example, at 602 the first client computing device 130 may receive a first input from a user of the client computing device 130 indicative of a desire to activate the sharing application. Such input may be, for example, one or more gestures or other touch inputs received via the display device 164 or other input devices 160 of the first client computing device 130. In example embodiments, the display device 164 may comprise a touch-sensitive display of the first client computing device 130. In such embodiments, the display device 164 may direct one or more signals or other information indicative of such an input to the file sharing module 156.

The file sharing module 156 may activate the sharing application on the first client computing device 130 in response to the first input, and in example embodiments, the sharing application may comprise an executable application, an executable file sharing engine, and/or other component of the computer readable media 142 and/or of the file sharing module 156. When executed, the sharing application may, for example, provide the user with access to one or more electronic files stored locally in the computer readable media 142 and/or other memory of the first client computing device 130. In some examples, the sharing application may provide a user interface, such as the user interface 302 described above with respect to FIG. 3, and may provide a secure environment by which one or more such electronic files may be shared and/or collaborated on with a user of one or more additional client computing devices, such as over the peer-to-peer communication protocol 136. For example, the sharing application may provide one or more controls, such as the controls 308, 310, 312 described above with respect to FIG. 3, configured to enable sharing of and/or collaboration on one or more of the electronic files via the protocol 136.

At 604, the file sharing module 156 may receive a second input from the user of the first client computing device 130 via at least one of the controls 308, 310, 312 provided by the sharing application. In example embodiments, the second input may be indicative of a desire to share one or more of the electronic files stored locally on the first client computing device 130 with at least one additional client computing device (e.g., the second client computing device 132). In such examples, the second client computing device 132 may be connectable to the first client computing device 130 via the protocol 136 and/or the network 102. In example embodiments, the second client computing device 132 may be connectable to the first client computing device 130 via the protocol 136 by disposing the second client computing device 132 at least partially within a zone 202 surrounding the first client computing device 130. For example, positioning the second client computing device 132 less than a maximum distance D away from the first client computing device 130 (e.g., at least partially within the zone 202) may cause the first client computing device 130 to automatically connect, sync, pair, bond, and/or otherwise communicate with the second client computing device 132. As described above with respect to FIG. 2, the maximum distance D and the resulting size of the zone 202 may vary depending on the configuration of the protocol 136.

At 606, the file sharing module 156 may provide a sharing request, via the protocol 136, at least partially in response to the second input received at 604. In particular, such a sharing request may be provided to the second client computing device 132 via one or more signals 314 directed to the second client computing device 132 via the protocol 136. Upon receiving such a sharing request the file sharing module 156 of the second client computing device 132 may generate a message 318 inquiring as to whether the user of the second client computing device 132 would like to participate in a sharing or collaboration session with the first client computing device 130. At 606, the file sharing module 156 of the second client computing device 132 may provide the message 318 to the user via the user interface 316, and the user may accept or deny the request via one or more controls 320(1), 320(2), 320(3) of the user interface 316. The file sharing module 156 of the second client computing device 132 may provide information indicative of the user's response via one or more signals 322, and the file sharing module 156 of the first client computing device 130 may receive the user's response to the sharing request, by way of the information carried by the one or more signals 322, prior to providing a packet 404 including the electronic file and/or a transformed file 406 generated based on the file 306.

If, at 606 the user of the second client computing device 132 accepts the request to participate in a sharing or collaboration session with the first client computing device 130, the file sharing module 156 of the first client computing device 130 may generate a first transformed file 406 based on a corresponding electronic file 306 selected by the user for sharing. As noted above, the first transformed file 406 may be generated based on the original electronic file 306. For example, the file sharing module 156 may generate the first transformed file 406 by copying the original electronic file 306, compressing the original electronic file 306, converting the original electronic file 306 into a different file format, and/or otherwise processing the original electronic file 306 into a suitable form for transfer in a packet 404 of information via the protocol 136. In example embodiments, the file sharing module 156 of the first client computing device 130 may generate the first transformed file 406 at least partially in response to the second input received from the user at 604. For example, in some embodiments the file sharing module 156 of the first client computing device 130 may generate the first transformed file 406 regardless of whether the user of the second client computing device 132 accepts the request to participate in a sharing or collaboration session.

At 608, the file sharing module 156 of the first client computing device 130 may provide a first packet 404 of information for sharing with the second client computing device 132 via the protocol 136. In example embodiments, the first packet 404 of information may include the first transformed file 406 and/or the original electronic file 306. In further examples, the first packet 404 of information may also include one or more security tokens 408 including one or more security keys, or other information uniquely identifying the first client computing device 130 and/or a user thereof. Such tokens 408 and/or other information may be utilized to ensure the secure transfer of files and/or information between the various client computing devices 130, 132, 134 described herein.

In example embodiments, the file sharing module 156 of the first client computing device 130 may generate one or more signals 402 including the first packet 404, and may direct such signals 402 to the second client computing device 132 via the protocol 136. Upon receiving the first packet 404 the file sharing module 156 of the second client computing device 132 may, at 608, open, decompress, and/or otherwise process the first transformed file 406 such that the original electronic file 306 may be presented to a user of the second computing device 132 via a user interface 410. In example embodiments, one or more of receiving the first packet 404 or opening, decompressing, and/or otherwise processing the first transformed file 406 may trigger the file sharing module 156 of the second client computing device 132 to activate a sharing application on the second client computing device 132. In example embodiments, the sharing application activated on the second client computing device 132 may be substantially similar to and/or the same as the sharing application described above with respect to step 602. Alternatively, in other examples the file sharing module 156 of the second client computing device 132 may activate such a sharing application in response to receiving the sharing request described above with respect to step 606.

Once the file 306 is open and/or active on the second client computing device 132, the user of the second client computing device 132 may edit, consume, revise, and/or otherwise modify the file 306 via the sharing application active on the second client computing device 132. Additionally, the user of the first client computing device 130 may make contemporaneous edits, revisions, and/or other modifications to the version of the electronic file 306 residing on the first client computing device 130. For example, at 610 the file sharing module 156 of the first client computing device 130 may provide and/or receive one or more packets of information including edits, revisions, modifications, and/or other collaborative input. In some examples, such as examples in which the protocol 136 comprises a NFC connection, edits, revisions, modifications, and/or other collaborative input may be transferred at 610 via respective signals and/or packets on a per-transaction basis when the first client computing device 130 is connected to the second client computing device 132 via the protocol 136. Alternatively, in examples in which the protocol 136 comprises a BLUETOOTH® connection, edits, revisions, modifications, and/or other collaborative input may be transferred between the first and second client computing devices 130, 132 at 610, via respective signals and/or packets, in real time. In such examples, edits, revisions and/or other modifications made by the user of the first client computing device 130 may appear substantially simultaneously (e.g., in real time) in the visual representation 412 of the file 306 being shared with the user of the second client computing device 132. Likewise, edits, revisions and/or other modifications made by the user of the second client computing device 132 may appear substantially simultaneously (e.g., in real time) in the visual representation 304 of the file 306 displayed on the first client computing device 130.

At 612, the file sharing module 156 may receive a completion request indicating that the user of the second client computing device 132 desires to terminate the sharing or collaboration session. In some examples, the user of the second client computing device 132 may provide an input via one or more controls 414(1), 414(2), 414(3) of the user interface 410 indicative of a desire to terminate the sharing our collaboration session. The file sharing module 156 of the second client computing device 132 may receive such an input and may, in response, generate one or more signals including information indicating the user's desire to terminate the session. Such signals may be directed to the first client computing device 130 via the protocol 136. In response to receiving such signals, the file sharing module 156 of the first client computing device 130 may provide one or more messages 504 to the user of the first client computing device 130 indicating that the user of the second client computing device 132 wishes to terminate the session and/or requesting approval for terminating the session. The user of the first client computing device 130 may provide an input accepting or denying the request, and the file sharing module 156 of the first client computing device 130 may direct one or more signals to the second client computing device 132 indicative of such an input.

In example embodiments, if the user of the first client computing device 130 accepts the request to terminate the existing sharing or collaboration session, the file sharing module 156 of the first client computing device 130 may, at 614, receive a second packet 508 of information via the protocol 136, and the second packet 508 of information may include among other things, a second transformed file 510 generated by the file sharing module 156 of the second client computing device 132 based at least partially on the electronic file 306 as modified during the sharing or collaboration session. For example, since the second transformed file 510 includes revisions, edits, modifications, and/or other collaborative input made by one or both of the users during the sharing or collaboration session, the second transformed file 510 may be different from the first transformed file provided at 608.

In example embodiments, the file sharing module 156 of the second client computing device 132 may, at 614, generate one or more signals including the second packet 508, and may direct such signals to the first client computing device 130 via the protocol 136. Upon receiving the second packet 508, the sharing module 156 of the first client computing device 130 may open, decompress, and/or otherwise process the second transformed file 510 such that the modified electronic file 306 may be stored in computer-readable media 142 of the first client computing device 130. Additionally or alternatively, at 614 the file sharing module 156 of the first client computing device 130 may direct the second transformed file 510 and/or the modified electronic file 306 to the computer-readable media 112 of one or more distributed computing resources 104, 106, 108 via the network 102 when connectivity to the network 102 is established.

As noted above, the wireless transfer and/or other sharing of electronic files between electronic devices is often facilitated via one or more public networks, private networks, or some combination of private and public networks. Such networks are typically optimized for use in environments in which connectivity between various electronic devices in the network is robust. However, in some environments it may be difficult for mobile devices and/or other computing devices to reliably connect with existing networks for the purpose of sharing and/or collaborating on electronic files. Accordingly, example embodiments of the present disclosure enable multiple computing devices to communicate and/or otherwise connect with each other via a peer-to-peer communication protocol that is separate from and/or outside of the networks described above. By communicating via such a protocol, example computing devices of the present disclosure may not be reliant upon connectivity to an external network for purposes of transferring and/or sharing of electronic files between the computing devices, and as a result, the user experience may be improved. Additionally, the transferring and/or sharing of electronic files via the peer-to-peer communication protocol may be relatively faster than analogous transfers of the electronic files via the external networks described above, thereby further improving the user experience and increasing efficiency. Moreover, since the peer-to-peer communication protocols described herein are operable within a relatively short range with respect to each individual computing device, the methods and processes described herein may allow for improved security over similar methods performed using external networks. As a result, the methods and processes described herein may be beneficial in some situations, such as in situations in which the electronic files being shared and/or transferred include sensitive or confidential information. The methods and processes described herein may also be advantageous in situations in which such electronic files are being shared and/or transferred in unsecured locations in which third parties may be present.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which may represent one or more operations that may be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described processes. The described processes, or portions thereof, may be performed by resources associated with one or more device(s) 104, 106, 108, 130, 132, 134 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A method, comprising:
   receiving a first input from a user of a first computing device;
   activating a document collaboration application on the first computing device in response to the input, the document collaboration application providing the user with access to an electronic file stored in a memory of the first computing device and providing at least one control configured to enable sharing of the electronic file via a peer-to-peer communication protocol;
   receiving a second input from the user, via the at least one control, to share the electronic file with a second computing device connectable to the first computing device via the peer-to-peer communication protocol;
   generating a first transformed file with the document collaboration application in response to the second input, wherein the first transformed file is based on the electronic file;
   sending a first packet of information to the second computing device via the peer-to-peer communication protocol, the first packet of information comprising the first transformed file and a token including a security key indicating that the first packet originated from the first computing device;
   determining if the first computing device has access to a network in communication with a remote computing resource, wherein the token is sent to the remote computing resource if the first computing device has access to the network in communication with the remote computing resource, and where the token is sent to the second computing device if the first computing device does not have access to the network, the second computing device comparing information on the token to information stored on the second computing device; and
   receiving a second packet of information via the peer-to-peer communication protocol, the second packet of information comprising a second transformed file generated by the second computing device based on at least one of comments on or edits to the electronic file, wherein the second transformed file is different from the first transformed file.

2. The method of claim 1, wherein the peer-to-peer communication protocol operates over one of a short-wavelength UHF radio wave connection, a near-field communication connection, a wireless local area network connection, an infra-red connection, a visible-light connection, a wired connection, or an acoustic connection.

3. The method of claim 1, further comprising sending a sharing request, via the peer-to-peer communication protocol, at least partially in response to the second input, and receiving a response to the sharing request prior to sending the first packet.

4. The method of claim 1, further comprising sending a third packet of information via the peer-to-peer communication protocol, and receiving a fourth packet of information via the peer-to-peer communication protocol, wherein the third packet of information comprises first modifications to the electronic file received from the user via the first computing device and the fourth packet of information comprises second modifications to the electronic file different from the first modifications.

5. The method of claim 1, wherein the first transformed file comprises a copy of an additional electronic file or a compressed version of the additional electronic file.

6. A method, comprising:
   receiving, using a document collaboration application operating on a first computing device, a first input from a user to share a first electronic file being stored on the first computing device;
   establishing, via a local network, a peer-to-peer connection in response to the first computing device being at least partially within a predefined distance range of a second computing device;
   providing a sharing request, via the peer-to-peer connection, at least partially in response to the first input;
   receiving a response to the sharing request;
   providing the first electronic file to the second computing device via the peer-to-peer connection at least partially in response to the sharing request;
   receiving a second input comprising changes to the first electronic file, wherein the changes to the first electronic file are shared between the first computing device and the second computing device on a per-transaction basis if the peer-to-peer connection uses a near-field communication connection, and changes to the first electronic file are shared between the first computing device and the second computing device substantially simultaneously if the peer-to-peer connection uses a short-wavelength UHF radio wave connection; and
   receiving, via the peer-to-peer connection, a second electronic file, the second electronic file being based on collaborative input made on the second computing device and based on the first electronic file.

7. The method of claim 6, wherein the first electronic file comprises a copy of an additional electronic file or a compressed version of the additional electronic file.

8. The method of claim 6, the method further comprising:
   displaying a visual representation of the first electronic file via a display of the first computing device,
   the second input from the user being indicative of first modifications to the electronic file, and
   providing the first modifications using the sharing application and via the peer-to-peer connection.

9. The method of claim 8, further comprising receiving second modifications to the electronic file via the peer-to-peer connection, wherein the second modifications are different from the first modifications.

10. The method of claim 9, wherein the peer-to-peer connection comprises a short-wavelength UHF radio wave connection and the second modifications are entered via the second computing device in communication with the first computing device via the short-wavelength UHF radio wave connection, the second modifications being displayed via the display in real time with entry of the second modifications.

11. The method of claim 6, further comprising providing a token with the first electronic file via the peer-to-peer connection, the token including a security key identifying the first computing device.

12. The method of claim 6, further comprising:
receiving modifications to the first electronic file via the peer-to-peer connection, and
providing the first electronic file, including the modifications, to a remote computing resource, wherein the remote computing resource is in communication with the electronic device via a network outside of the peer-to-peer connection.

13. A computing device, comprising:
one or more computer-readable media including a first file sharing and collaboration module; and
a processing unit operably coupled to the computer-readable media, the processing unit adapted to execute the first file sharing and collaboration module, wherein the first file sharing and collaboration module is configured to:
receive a first input from the user to share an electronic file via a peer-to-peer communication protocol, the electronic file being stored in the computer-readable media,
provide, in response to the first input and via the peer-to-peer communication protocol, the electronic file to a second computing device, wherein providing the electronic file to the second computing device causes the second computing device to activate a second file sharing and collaboration module stored within a memory associated with the second computing device;
receive a second input comprising changes to the electronic file, wherein the changes to the electronic file are shared between the computing device and the second computing device on a per-transaction basis if the peer-to-peer communication protocol uses a near-field communication connection, and changes to the electronic file are shared between the computing device and the second computing device substantially simultaneously if the peer-to-peer communication protocol uses a short-wavelength UHF radio wave connection; and
receive, via the peer-to-peer communication protocol, a revised file generated from the second computing device, wherein the revised file is different from the electronic file.

14. The computing device of claim 13, further comprising a touch-sensitive display, wherein the input comprises a touch input received via the touch-sensitive display.

15. The computing device of claim 14, wherein the first file sharing module is further configured to provide a user interface for display on the touch-sensitive display, the user interface including a plurality of controls configured to receive input from the user.

16. The computing device of claim 13, further including a protocol interface configured to provide a sharing request, via the peer-to-peer communication protocol, at least partially in response to the input.

17. The computing device of claim 16, wherein:
the protocol interface is configured to provide the sharing request at least partially in response to the computing device being disposed within approximately 10 centimeters of the second computing device if the peer-to-peer communication protocol uses a near-field communication connection, and
the protocol interface is configured to provide the sharing request at least partially in response to the computing device being disposed within approximately 4 meters of the second computing device if the peer-to-peer communication protocol uses a short-wavelength UHF radio wave connection.

18. The computing device of claim 13, wherein the computing device is a smartphone or a tablet.

19. The computing device of claim 13, wherein:
access to the electronic file via the peer-to-peer communication protocol is restricted to the second computing device, and
access to the revised file via the peer-to-peer communication protocol is restricted to the first computing device.

20. The computing device of claim 13, wherein the electronic file is one electronic file of a plurality of electronic files stored on the computing device, the electronic files being organized using a master hash list that includes a list of folder hashes, sub-folder hashes, and file hashes and may be used to compare a current state of folder hashes, sub-folder hashes, and file hashes in order to determine if the content within the folders, sub-folders, and/or files has changed since the master hash list was last computed and recorded.

21. A method, comprising:
receiving a first input from a user of a first computing device;
activating a document collaboration application on the first computing device in response to the input, the document collaboration application providing the user with access to an electronic file stored in a memory of the first computing device and providing at least one control configured to enable sharing of the electronic file via a peer-to-peer communication protocol;
receiving a second input from the user, via the at least one control, to share the electronic file with a second computing device connectable to the first computing device via the peer-to-peer communication protocol;
generating a first transformed file with the document collaboration application in response to the second input, wherein the first transformed file is based on the electronic file;
sending a first packet of information to the second computing device via the peer-to-peer communication protocol, the first packet of information comprising the first transformed file and a token including a security key indicating that the first packet originated from the first computing device;
in response to determining that the first computing device has access to a network in communication with a remote computing resource, sending the token to the remote computing resource, the remote computing resource granting the second computing device access to the first packet of information based on a comparison of information on the token to information saved at the remote computing resource; and
receiving a second packet of information via the peer-to-peer communication protocol, the second packet of information comprising a second transformed file generated by the second computing device based on at least one of comments on or edits to the electronic file, wherein the second transformed file is different from the first transformed file and the electronic file comprises a first electronic file and the second input comprises changes to the first electronic file, wherein the changes to the first electronic file are shared between the first computing device and the second computing device on a per-transaction basis if the peer-to-peer connection uses a near-field communication connection, and changes to the first electronic file are shared between the first computing device and the second computing device substantially simultaneously if the peer-to-peer connection uses a short-wavelength UHF radio wave connection.

\* \* \* \* \*